No. 872,311. PATENTED NOV. 26, 1907.
E. SUTHERLAND.
VEHICLE WHEEL.
APPLICATION FILED NOV. 2, 1906.
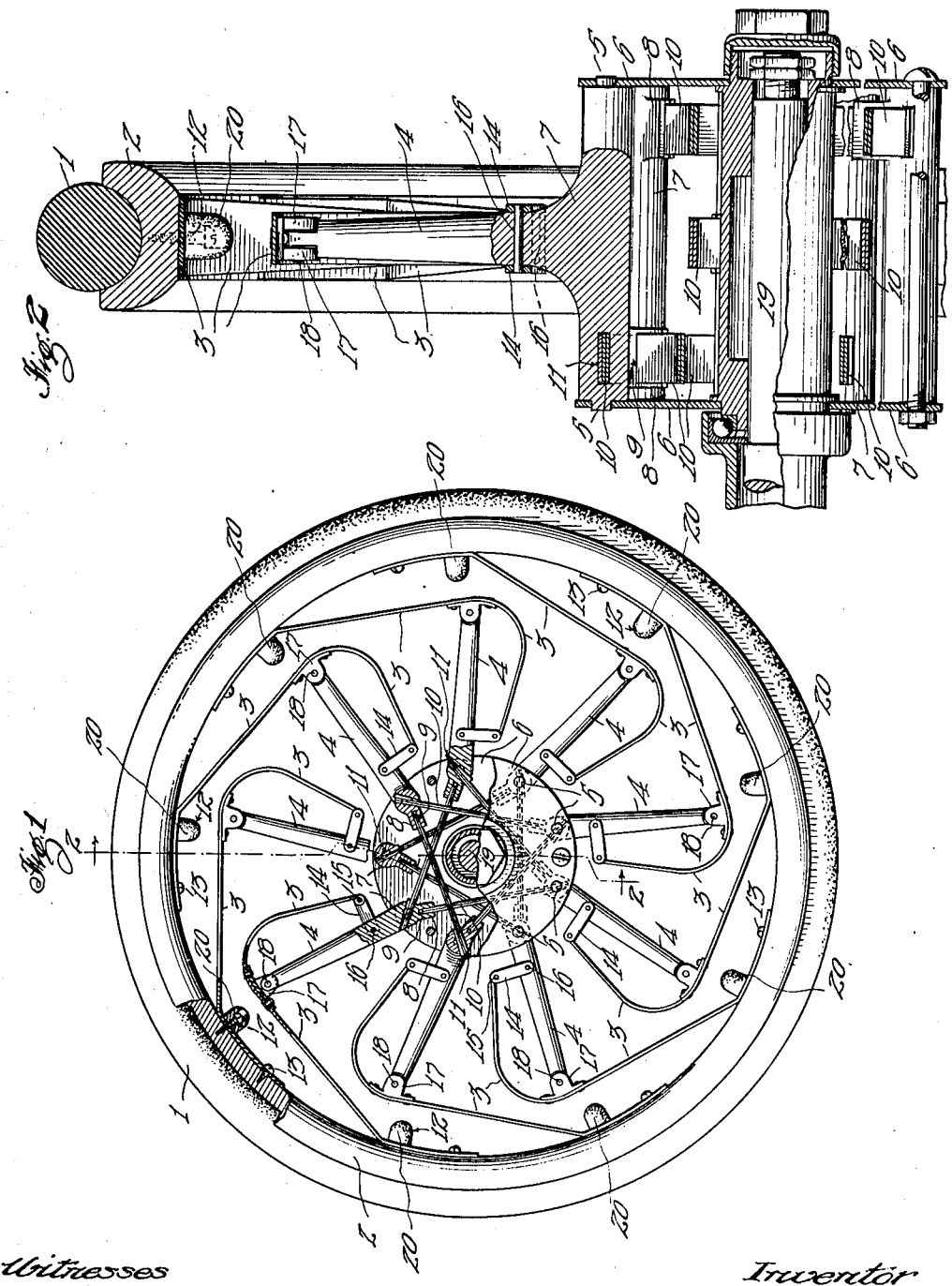

UNITED STATES PATENT OFFICE.

EMIL SUTHERLAND, OF HOLLYWOOD, CALIFORNIA.

VEHICLE-WHEEL.

No. 872,311.   Specification of Letters Patent.   Patented Nov. 26, 1907.

Application filed November 2, 1906. Serial No. 341,728.

*To all whom it may concern:*

Be it known that I, EMIL SUTHERLAND, a citizen of the United States, residing at Hollywood, in the county of Los Angeles and State of California, have invented new and useful Improvements in Vehicle-Wheels, of which the following is a specification.

The object of my invention is to provide a wheel for a vehicle which is light, strong and durable which embodies means between the rim or felly of the wheel and the hub thereof to prevent the jar of the rim of the wheel from being transmitted to the hub thereof. I accomplish this object by means of the device described herein and shown in the accompanying drawings in which:—

Figure 1—is a side elevation of a wheel partly in section embodying my invention. Fig. 2—is an enlarged transverse section taken on line 2—2 of Fig. 1.

My device is more particularly adapted for use in auto vehicles adapted to be driven at a high rate of speed over rough roads and which are usually provided with elastic or pneumatic tires to absorb the jars occasioned thereby.

In the drawings 1 is a solid rubber tire, in place of which a pneumatic tire can be used if desired. 2 is the felly thereof on which the rubber tire is mounted. To permit the non-deformable rim of the wheel to be thrown upward suddenly in passing over inequalities in the roadbed I have interposed between the felly and the spokes the carrying springs 3. The spokes 4 are pivotally mounted as at 5 in two annular plates 6 forming hubs. The inner ends of the spokes terminate in the bifurcations 7 which carry on their outer ends the bearing wrists 5 which are journaled in the hub plates 6 as before stated. Projecting inwardly from either end of the bifurcations 7 is a projecting lug 8 provided with a socket or eye 9 adapted to slidingly receive one end of a flat compensating spring 10. The other end of these springs is keyed or otherwise secured in transverse openings 11 in the end of the bifurcations 7. By means of these compensating springs projecting one end into and the other end secured in the inner end of the spokes I provide means to hold the spokes in a position nearly radial to the hub as shown in Fig. 1.

Each of the carrying springs 3 is detachably secured in two places as at 12 and 13 at its outer end to the rim or felly. The inner ends of these springs are pivotally attached to one end of the connecting link 14 as at 15, this connecting link is swingingly mounted on and close to the inner end of the spoke as at 16, thereby workably connecting the inner end of the carrying spring to the spoke and connecting the rim and hub of the wheel together. These carrying springs carry approximately in their center, securely affixed thereto, a bracket 17 to which the outer end of each spoke is pivoted by the pintle bolt 18. The hub of the wheel is mounted on the axle 19 and is provided with the ball bearings of ordinary construction. Thus it will be seen that I have provided a wheel in which that part of the wheel connecting the hub with the rim is so constructed as to permit the rim of the wheel to have a rapid up and down movement without necessarily affecting the hub by the jars which are occasioned by the inequalities of the surface of the roadbed when the wheel is being driven rapidly over the same. The flat configuration of these springs, while they are resilient will impart great rigidity so far as any lateral movement of the wheel is concerned and rigidly hold the wheel in proper position at right angles to the axle on which the same is mounted and will at the same time afford the necessary resiliency to permit the rim of the wheel to bob up and down and relieve all parts of the vehicle except the rim of the jars occasioned by inequalities in the surface of the roadbed while the wheel is being rapidly passed thereover.

To provide additional means of preventing too sudden a jar in case the carrying springs are not strong enough to hold the rim from contacting with the ends of the spokes I have provided the elastic bumpers 20 against which the carrying springs will contact providing a cushion which will prevent too abrupt a jar.

Having described my invention what I claim as new and desire to secure by Letters Patent is:—

1. A vehicle wheel having a non-deformable rim; carrying springs interposed between the spokes and the rim and workably connecting the same together; annular plates forming hubs and carrying the spokes pivotally connected thereon; compensating springs extending from the inner end of one spoke to the inner end of another spoke, the said springs being keyed to one spoke and having a sliding fit in a socket in another spoke.

2. In a vehicle wheel, a plurality of spokes being pivotally secured at their inner ends and carrying on their outer ends carrying springs and connected together at their inner ends with compensating springs.

3. In a vehicle wheel of the character herein described, spokes carrying on their outer ends carrying springs, the said carrying springs being detachably secured to the rim at one end and pivotally connected to a link at the other end, the said link being pivotally secured to the inner end of the spoke; a bracket mounted approximately on the center of the carrying springs and pivotally connected with the outer end of the spokes.

4. A wheel of the character herein described, having two annular plates surrounding and forming part of the hub of the wheel, the said plates having holes therein for the reception of bearing wrists on the inner end of the spokes, in combination with spokes having bifurcated inner ends with bearing wrists thereon; and compensating springs secured to the inner ends of the spokes, each spring being rigidly secured at one end to the inner end of the spoke and the other end of the spring having a sliding engagement with the inner end of another spoke, and means to workably connect the rim of the wheel with the spokes.

5. In a vehicle wheel of the character herein described, the herein described spoke, having on its outer ends means to pivotally secure the same to a carrying spring and having on the inner end thereof a socket for the sliding reception of one end of a compensating spring and having keyed in said inner end an end of another compensating spring.

6. In a wheel of the character herein described, having the inner ends of the spokes pivotally connected with the hub compensating springs, one end of each rigidly secured in the inner end of one spoke and having a sliding engagement in the inner end of another spoke.

7. The combination in a wheel having an outer non-deformable rim; of carrying springs interposed between the spokes and the rim, each spring being rigidly connected to the rim at its outer end and its inner end pivotally connected near the center of the spring to the outer end of the spoke and having a swinging connection at its inner end with the inner end of the spoke; spokes pivotally mounted in annular plates on the hub and carrying a steadying spring on the inner end of the spoke and having a sliding engagement with an end of another steadying spring.

In witness that I claim the foregoing I have hereunto subscribed my name this 24th day of October, 1906.

EMIL SUTHERLAND.

Witnesses:
G. E. HARPHAM,
EDMUND A. STRAUSE.